United States Patent [19]

West

[11] Patent Number: 4,619,067
[45] Date of Patent: Oct. 28, 1986

[54] FISHING LURE ASSEMBLY

[76] Inventor: Robert A. West, 76-6294 Kupuna St., Kailua-Kona, Hi. 96740

[21] Appl. No.: 724,356

[22] Filed: Apr. 18, 1985

[51] Int. Cl.⁴ .............................................. A01K 85/00
[52] U.S. Cl. .................................. 43/42.09; 43/42.28; 43/42.36
[58] Field of Search ................. 43/42.09, 42.29, 42.38, 43/42.28, 42.05, 42.36

[56] References Cited

U.S. PATENT DOCUMENTS

| 1,612,264 | 12/1926 | Cressey | 43/42.28 |
| 1,754,567 | 4/1930 | Newell | 43/42.28 |
| 2,419,037 | 4/1947 | Safford | 43/42.05 |
| 2,983,065 | 5/1961 | Ferguson | 43/42.09 |
| 3,947,989 | 4/1976 | Bart | 43/42.09 |
| 4,054,004 | 10/1977 | Schott | 43/42.09 |
| 4,215,506 | 8/1980 | Le Boeuf | 43/42.05 |

*Primary Examiner*—Gene P. Crosby
*Attorney, Agent, or Firm*—Flehr, Hohbach, Test, Albritton & Herbert

[57] ABSTRACT

A fishing lure assembly employing a body and one or more replaceable skirts secured to the body by a threaded connection therebetween.

3 Claims, 5 Drawing Figures

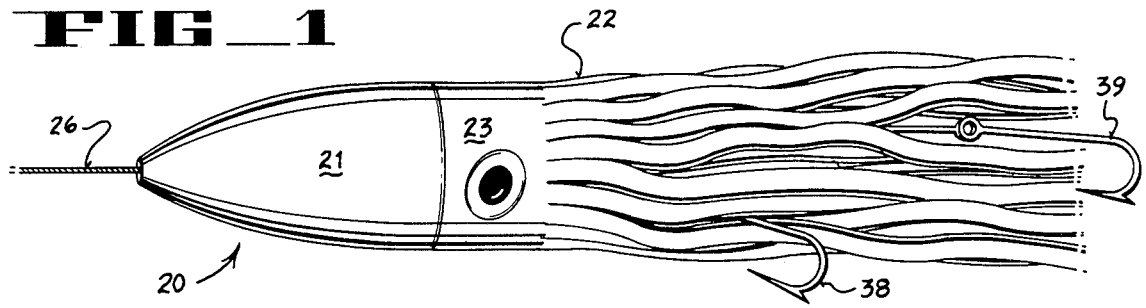
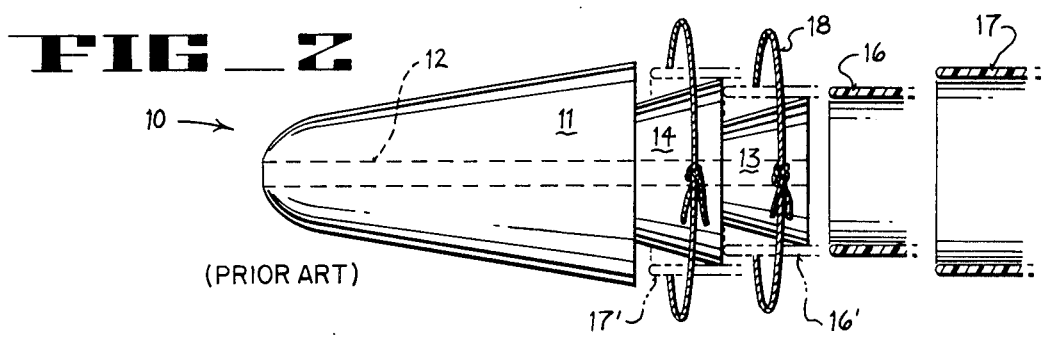
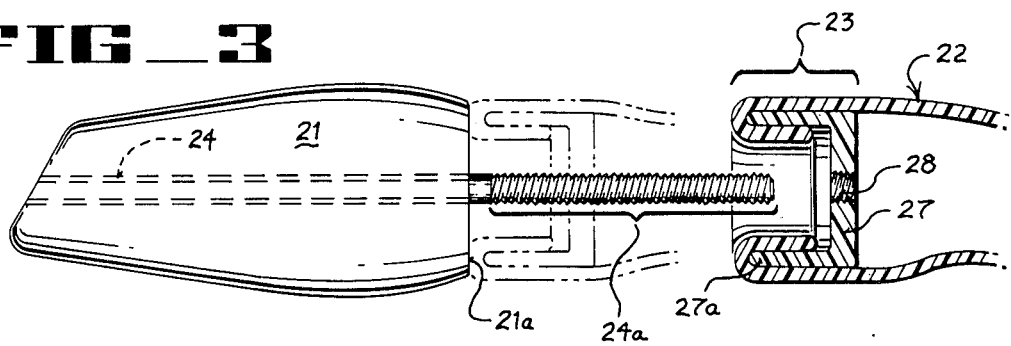
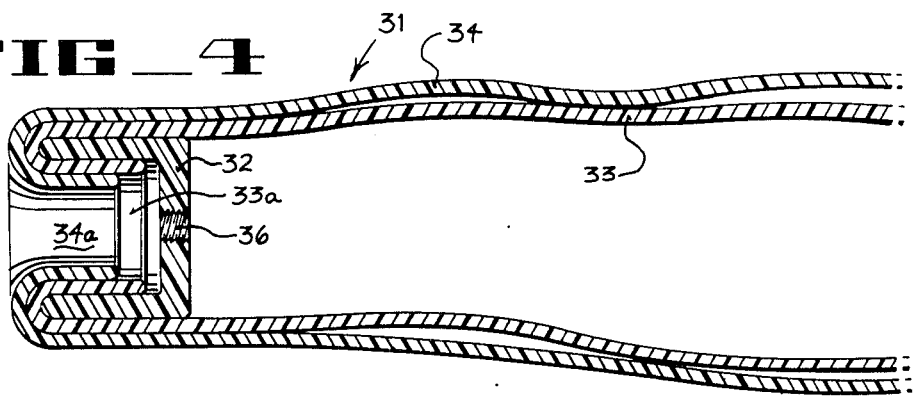
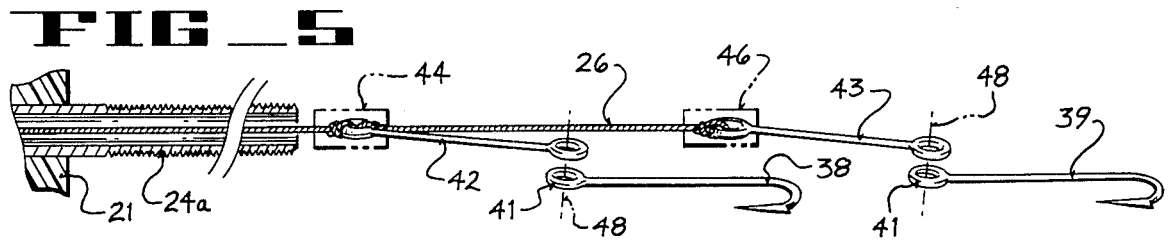

FISHING LURE ASSEMBLY

This invention pertains to a fishing lure assembly of a type characterized by a detachable skirt.

Heretofore, a fishing lure assembly of a type including a solid body forming a head portion has been provided in a manner whereby the skirt portion must be wired onto the head portion. While the lure is in use the skirt portion can be torn loose by relatively large fish thereby removing the decorative, fish-attracting skirt from the lure. At such times it becomes necessary to wire a replacement skirt onto the head portion. This obviously, puts an end to the fishing for that particular line or lure until the lure has been repaired.

Thus, wiring the fish-attracting skirts onto the head portion of the lure assembly as heretofore practiced has been relatively time-consuming and generally unsatisfactory, but has been practiced for a number of years. Accordingly, there has been a need for an improved lure assembly.

In general, an improved fishing lure assembly includes a smooth tapered head portion, a decorative fish-attracting trailing skirt portion, and means for making threaded interconnection between the head portion and the trailing portion to permit the trailing portion to be readily removed from or attached to the head portion.

In general it is an object of the present invention to provide an improved fishing lure assembly.

Another object of the invention is to provide an improved readily separable fishing lure assembly whereby the fish-attracting skirt portion can be quickly replaced and attached to the head portion.

Yet a further object of the present invention is to provide a fishing lure assembly characterized by an improved head portion having a rearwardly extending threaded tubular element adapted to receive a trailing skirt portion thereon.

The foregoing and other objects of the invention will become more readily evident from the following detailed description of a preferred embodiment when considered in conjunction with the drawings.

FIG. 1 shows a diagrammatic view of a fishing lure assembly according to the invention;

FIG. 2 shows an exploded diagrammatic view of a portion of a fishing lure assembly according to the prior art for purposes of illustration and comparison;

FIG. 3 shows a side elevation view, partially in section, of an improved fishing lure according to the invention;

FIG. 4 shows a diagrammatic side elevation section view of a decorative skirt portion of a fishing lure assembly as shown in FIG. 1; and FIG. 5 shows a diagrammatic side view partially in section of the arrangement of a leader with hooks for use in conjunction with a fishing lure assembly according to the invention.

DETAILED DESCRIPTION OF A PREFERRED EMBODIMENT

According to a prior art fishing lure assembly 10 as shown in FIG. 2 a solid body forms a head 11 which includes a central opening 12 extending the length thereof for purposes of passing a leader therethrough together with hooks attached at the ends of the leader as described further below. The trailing end of head 11 includes a pair of truncated conical portions 13, 14, machined from the body of material.

Lure assembly 10 includes a pair of concentrically disposed fish-attracting decorative skirts 16, 17 formed with a tubular end. In order to attach one or both of skirts 16, 17 to conical portions 13, 14 it is necessary to slide the tubular portion of skirt 16 over the side of portion 13 as shown in phantom lines 16'. After the tubular end of skirt 16 has been so positioned, a stainless steel wire 18 must be wrapped about the end of skirt 16 to tighten it securely against conical portion 13. In many instances it is necessary or desirable to employ a pair of fish-attracting decorative skirts and in such case the second skirt 17 is applied to conical portion 14 in the same manner noted above after first applying the inner skirt 16.

It will be readily evident that the foregoing procedure can consume a substantial amount of time and create a substantial amount of frustration for a fisherman anxious to get his line back in the water.

Accordingly, an improved fishing lure assembly 20 has been provided whereby the decorative, fish-attracting skirt can be readily replaced if destroyed or consumed as now to be described.

Assembly 20 includes a head portion 21 and a decorative fish-attracting skirt portion 22. Skirt 22 includes a tubular resilient leading end 23. Accordingly, head 21 includes a solid elongate body, preferably of plastic material or other suitably moldable material or the like. An elongate tubular element 24 embedded in head portion 21 extends therethrough and is adapted to pass a leader 26 therethrough. A trailing portion 24a of element 24 includes threads distributed therealong and protrudes rearwardly from the body of head 21 to form part of a connection between head portion 21 and the trailing skirt portion 22.

As shown best in FIG. 3 means carried by the leading end 23 of skirt 22 for threadedly engaging portion 24a of tube 24 includes a rigid plastic cup 27 formed to include a threaded opening 28 through the "bottom" of the cup for receiving the end of tube 24. To reinforce the threads of cup 27, a metallic insert can be pressed into cup 27 with the insert providing the threaded opening.

Skirt 22 includes a resilient tubular portion 23 at its leading end. Tubular portion 23 surrounds cup 27 and is folded rearwardly into cup 27 to lie across the edge 27a of the cup. That part of tubular skirt portion 23 lying across the edge 27a is disposed to be pinched between the rear surface 21a of head 21 and the edge 27a of cup 27 as cup 27 is threaded onto the end 24a of tubing 24 (as shown in phantom lines in FIG. 3). In this way the decorative skirt 22 will be retained, and in the event that it should be consumed or destroyed, the skirt can be quickly replaced simply by unscrewing the skirt from threaded portion 24a and replacing it with another.

As shown in FIG. 4 a decorative, fish-attracting skirt 31 includes a plurality of concentrically oriented skirts carried by a single cup 32. Cup 32 is similar to cup 27 but usually will have a somewhat larger diameter in order to accommodate the additional material being folded into the cup.

Accordingly, an inner skirt 33 includes a leading tubular end portion 33a folded into cup 32. The outer skirt 34 also includes a leading tubular resilient end portion 34a folded rearwardly into cup 32.

As thus arranged the threaded portion 24a of tube 24 can readily be threaded into the opening 36 for purposes of attaching the dual skirt unit shown in FIG. 4.

As is known, hooks carried inside skirt portion 22 or 31 may be provided as now to be described with respect to FIGS. 1 and 5.

Accordingly, leader 26 carries a front hook 38 and a back hook 39 located in displaced positions along leader 26. For example, hooks 38, 39 each includes an eyelet 41 at their leading ends. Eyelets 41 serve to couple their associated hooks to the trailing end of a stainless steel extender 42, 43 respectively. The leading end of each extender 42, 43 is coupled to leader 26 by means of a crimpable sleeve-like fitting 44, 46. The leading fitting 44 is somewhat larger than the opening defined through tubular element 24. Means for coupling hooks 38, 39 to their respective extenders 42, 43 has been diagrammatically represented by the centerlines 48 since various means of attachment are known for making such connections.

From the foregoing it will be readily evident that there has been provided an improved lure assembly wherein replacement of a decorative, fish-attracting skirt can be quickly attached or detached from head portion 21.

I claim:

1. A fishing lure assembly comprising a head portion, an elongate tube embedded in said head portion, the trailing end of said tube extending rearwardly from said head portion, said trailing end being threaded, a rigid cup having a threaded portion for threadedly engaging the threaded trailing end of said tube, a decorative shirt for attracting fish thereto formed at its leading end with a resilient tubular portion surrounding the cup and folded rearwardly into same to lie across the edge of said cup, that part of said tubular skirt portion lying across the edge of said cup being disposed to be pinched between the rear of said head portion and the edge of said cup to retain said skirt to said head in response to screwing said cup along the threaded trailing end of said tube until the cup and head tightly grip said resilient tubular portion therebetween.

2. In a fishing lure assembly of a type having a solid body forming a head including a rearwardly extending threaded element, the improvement comprising a decorative skirt to be trailed behind said head for attracting fish thereto, threaded means carried by the leading end of said skirt for threadedly engaging said element to readily releasably couple said skirt to the head portion, the leading end of said skirt being disposed to be pinched and entirely held between said threaded means and said head soley by said threaded means and said head by threadedly advancing said threaded means sufficiently toward said head to retain said skirt therebetween.

3. In a fishing lure assembly of a type having a solid body forming a head portion including a rearwardly extending threaded element, the improvement comprising a plurality of decorative skirts to be disposed about one another and trailed behind said head portion for attracting fish thereto, threaded means carried by the leading end of said skirts for threadedly engaging said threaded element to readily releasably couple said skirts to said head, the leading ends of said skirts being disposed to be captured and entirely held between said head and said threaded means soley by said head and said threaded means in response to tightening said threaded means thereagainst.

* * * * *